(12) United States Patent
Taulbee et al.

(10) Patent No.: US 10,607,184 B2
(45) Date of Patent: Mar. 31, 2020

(54) SYSTEM AND METHOD FOR DETERMINING AN AMOUNT OF DISPOSABLE MATERIAL IN A SPOOL

(71) Applicant: Walmart Apollo, LLC, Bentonville, AR (US)

(72) Inventors: Alvin S. Taulbee, Springdale, AR (US); Nicholaus A. Jones, Fayetteville, AR (US); Jeremy Tingler, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/952,777

(22) Filed: Apr. 13, 2018

(65) Prior Publication Data
US 2018/0300674 A1    Oct. 18, 2018

Related U.S. Application Data

(60) Provisional application No. 62/486,229, filed on Apr. 17, 2017.

(51) Int. Cl.
*G06Q 10/08* (2012.01)
*G06K 7/14* (2006.01)
*G06K 7/10* (2006.01)

(52) U.S. Cl.
CPC ....... *G06Q 10/087* (2013.01); *G06K 7/10366* (2013.01); *G06K 7/1413* (2013.01)

(58) Field of Classification Search
None
See application file for complete search history.

(56) References Cited

U.S. PATENT DOCUMENTS

| 7,726,599 B2 | 6/2010 | Lewis et al. |
| 8,366,035 B2 | 2/2013 | Kling et al. |
| 8,807,475 B2 | 8/2014 | Rodrian et al. |

(Continued)

FOREIGN PATENT DOCUMENTS

| JP | 2010-089360 A | 4/2010 |
| WO | 2015142151 A1 | 9/2015 |

OTHER PUBLICATIONS

Barburski, M. et al. "RFID Technology in the Textile Industry"; AUTEX Research Journal, vol. 8, No. 3, Sep. 2008 (pp. 92-96).

(Continued)

*Primary Examiner* — Paul Danneman
(74) *Attorney, Agent, or Firm* — Venable LLP; Jeffri A. Kaminski

(57) ABSTRACT

A method and a system for determining an amount of material remaining in a spool are provided herein. The system includes a radiofrequency identification (RFID) reader that is configured to read an RFID tag disposed at an end of a core of the spool. The RFID reader is provided on or in a vicinity of a support surface configured to hold at least a portion of the material. The system further includes a computer system in communication with the RFID reader, the computer system being configured to compute an amount of remaining material in the spool based on a thickness of the material and based on a number of revolutions of the spool. The number of revolutions is determined by a number of times the RFID tag on the spool comes in a reading vicinity of the RFID reader.

19 Claims, 4 Drawing Sheets

(56) References Cited

U.S. PATENT DOCUMENTS

| | | |
|---|---|---|
| 9,489,650 B2 | 11/2016 | Schoening et al. |
| 2005/0231583 A1 | 10/2005 | Maghakian |
| 2009/0177315 A1 | 7/2009 | Goeking et al. |
| 2010/0059618 A1 | 3/2010 | Foltz et al. |
| 2016/0023863 A1* | 1/2016 | Martin ................. B65H 16/025 242/563.2 |
| 2016/0059983 A1* | 3/2016 | Yoshina ............... G01N 33/346 242/160.4 |
| 2017/0182605 A1* | 6/2017 | Rajagopalan ........ B23K 37/003 |

OTHER PUBLICATIONS

International Search Report and Written Opinion dated Sep. 4, 2018, in corresponding International Application No. PCT/US2018/027555 (7 pages).

* cited by examiner

SYSTEM AND METHOD FOR DETERMINING AN AMOUNT OF DISPOSABLE MATERIAL IN A SPOOL

BACKGROUND

1. Technical Field

The present disclosure relates generally to inventory management of disposable material and more specifically to systems and methods of determining an amount of disposable material in a spool.

2. Introduction

Various disposable materials, such as fabric, are carried in rolls or spools. In the fabric, textile industry, the term "bolt" is often used to refer to a unit of measurement for a variety of materials stored in a roll or spool. The length of a bolt is usually either around 40 yards or around 100 yards. However, the length may vary according to the type of material. For example, a bolt of canvas is traditionally about 39 yards. The width of a bolt is usually about 45 inches or about 60 inches. However, bolts with other widths are also available.

The spools or rolls of material (e.g., fabric, plastic, etc.) are displayed on store shelves in stores such as Wal-Mart for selling to customers. When a customer selects a specific material such as a type of fabric, and/or a specific design, a roll or spool containing the selected fabric is taken to a desk, table or counter to be measured and cut by a store clerk or store associate to a desired length as requested by a customer. The length is often measured manually by the store clerk using a ruler, a tape measure or a yardstick. Therefore, the length measurement may be subject to human error. The length error is not accounted for, captured or recorded. As a result a discrepancy may exist between an actual amount of material (e.g., a length of material) remaining in the roll, spool or bolt and the calculated amount of material remaining in the spool that is recorded and stored in the store computer database. The calculated amount of remaining material is calculated by subtracting the amount of material sold to a customer from an initial amount or previously recorded amount of material in the roll. Therefore, if the store clerk makes an error when cutting the material or makes an error when recording or reporting the amount of material cut, this error will be reflected in the remaining amount of material.

In addition, there may be a discrepancy in the initial amount of material in the roll. This error may originate from the manufacturer or wholesaler of the material. Indeed, there are situations where the manufacturer may specify that a roll or spool has X amount (or length) of material but in practice the roll actually has Y amount of material. The difference between the amount X of material and the amount Y of material is another type of error that may be compounded with the previous store clerk measurement or recording error. The error originating from the manufacturer and/or the error originating from the store clerk may lead to an incorrect amount of remaining material in a spool or roll being recorded. This can create various logistical problems including problems in inventory management.

Therefore, there is a need for a novel method and system of determining an amount of material remaining in a spool or roll. The method and system disclosed herein cure the above and other problems of existing techniques and methods.

SUMMARY

An aspect of the present disclosure is to provide a system for determining an amount of material remaining in a spool. The system includes a radiofrequency identification (RFID) reader, the RFID reader being configured to read an RFID tag disposed at an end of a core of the spool, the RFID reader being provided on or in a vicinity of a support surface configured to hold at least a portion of the material when unloaded from the spool. The system further includes a computer system in communication with the RFID reader, the computer system being configured to compute an amount of remaining material in the spool based on a thickness of the material and based on a number of revolutions of the spool, the number of revolutions being determined by a number of times the RFID tag on the spool comes in a reading vicinity of the RFID reader.

Another aspect of the present disclosure is to provide a system for determining an amount of material remaining in a spool. The system includes a radiofrequency identification (RFID) reader, the RFID reader being configured to read an RFID tag disposed at an end of a core of the spool, the RFID reader being provided on or in a vicinity of a support surface configured to hold at least a portion of the material when unloaded from the spool. The system also includes a weighting scale disposed at the support surface, the weighting scale being configured to measure a weight of the spool. The system further includes a computer system in communication with the RFID reader, the computer system being configured to compute an amount of remaining material in the spool based on a thickness of the material and based on a number of revolutions of the spool, the number of revolutions being determined by a number of times the RFID tag on the spool comes in a reading vicinity of the RFID reader. The computer system is configured to further compute the amount of remaining material in the spool based on a measured weight of the spool and using a density of the material and further compare the amount of remaining material in the spool obtained using the weight with the amount of remaining material in the spool obtained using the number of revolutions.

Yet a further aspect of the present disclosure is to provide a method for determining an amount of material remaining in a spool. The method includes reading using a radiofrequency identification (RFID) reader an RFID tag disposed at an end of a core of the spool, the RFID reader being provided on or in a vicinity of a support surface configured to hold at least a portion of the material when unloaded from the spool; and computing, using a computer system in communication with the RFID reader, an amount of remaining material in the spool based on a thickness of the material and based on a number of revolutions of the spool, the number of revolutions being determined by a number of times the RFID tag on the spool comes in a reading vicinity of the RFID reader.

Additional features and benefits of the disclosure will be set forth in the description which follows, and in part will be obvious from the description, or can be learned by practice of the herein disclosed principles. The features and benefits of the disclosure can be realized and obtained by means of the instruments and combinations particularly pointed out in the appended claims. These and other features of the disclosure will become more fully apparent from the following description and appended claims, or can be learned by the practice of the principles set forth herein. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

DETAILED DESCRIPTION

Figure 1:
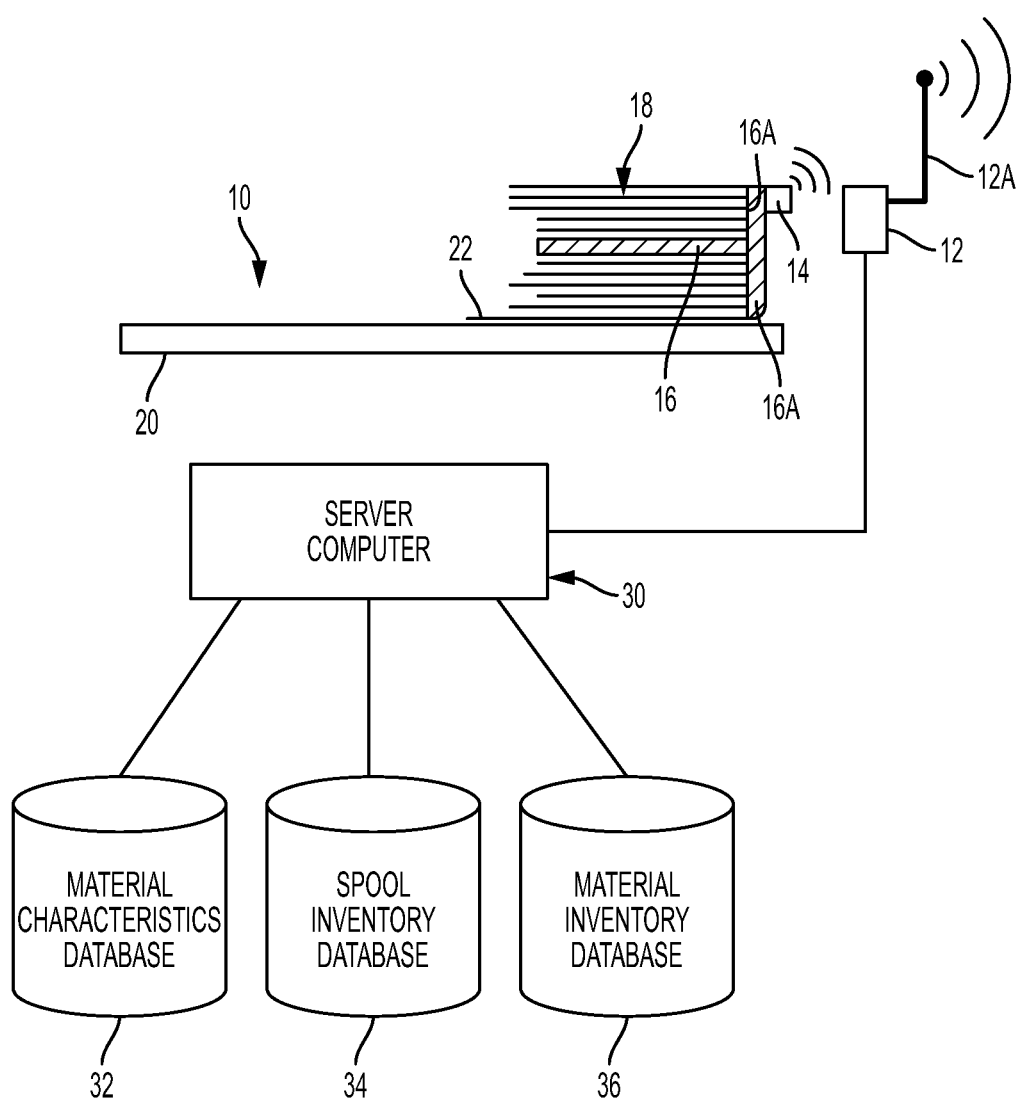
FIG. 1 shows a system for determining an amount of material remaining in a spool, according to an embodiment of the present disclosure.

FIG. 1 shows a system for determining an amount of material remaining in a spool, according to an embodiment of the present disclosure. The system 10 comprises a radiofrequency identification (RFID) reader 12. The RFID reader 12 is configured to read an RFID tag 14. The RFID tag 14 is disposed at an end 16A of a core 16 of a spool 18. The RFID reader 12 is provided on or in a vicinity of a support surface 20 configured to hold at least a portion of a material 22 when unloaded from the spool 18.

Figure 2:
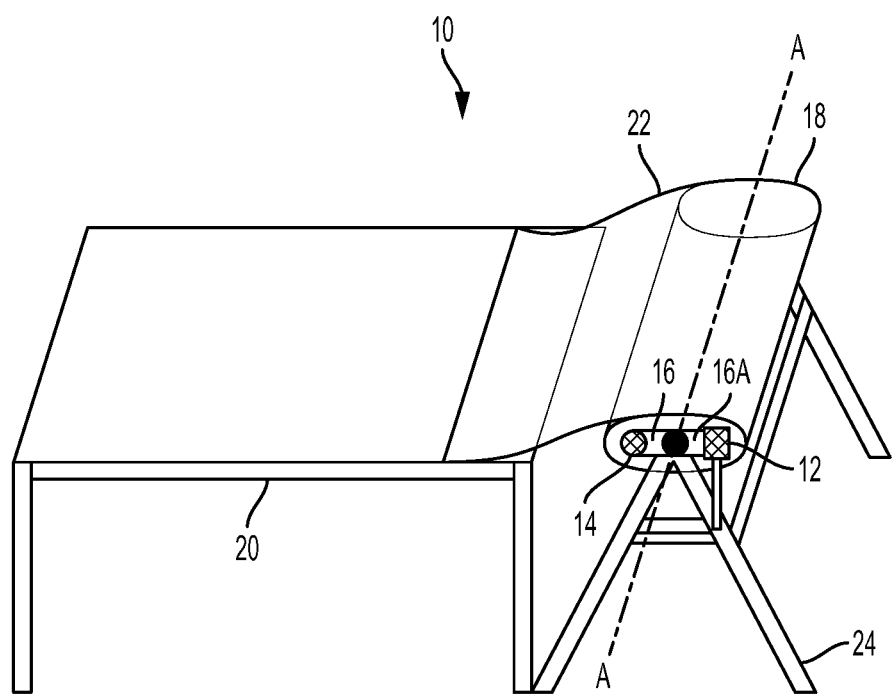
FIG. 2 depicts an example of a setup for mounting a spool of material on a rotating mechanism, according to an embodiment of the present disclosure.

In an embodiment of the present disclosure, the spool 18 is mounted on a delivery mechanism 24 configured to rotate upon pulling an end of the material 22 from the spool 18, as shown in FIG. 2. FIG. 2 depicts an example of a setup for mounting the spool 18 on a rotating delivery mechanism 24, according to an embodiment of the present disclosure. The rotating delivery mechanism 24 enables a store clerk or associate to pull on an end of the material 22 onto the support surface 20 (e.g., a table, a countertop or any working surface, etc.) to put a desired portion of the material 22 on the support surface 20. When a desired amount or length of the material 22 requested by a customer is drawn by the store clerk or associate, the store clerk cuts the requested piece of material 22, puts a price tag on the piece and hands the piece to the customer. In an embodiment of the present disclosure, the material 22 includes woven fabric, polyester, nylon, vinyl or polyethylene, etc.

The RFID reader 12 and the RFID tag 14 communicate information between one another through radio waves. When the RFID tag 14 enters a reading zone, area or reading vicinity of the RFID reader 12, the RFID reader 12 signals the RFID tag 14 to transmit data stored in the RFID tag 14 to the RFID reader 12. The RFID tag 14 may include an electronic chip and an antenna that are encapsulated in a package for protection from the external environment. The RFID tag 14 may have different forms depending on intended use. For example, the RFID tag 14 can be configured to be attached to outside parts of the core 16 of the spool 18 of material 22 (such as textile or fabric). There are two types of RFID tags. One type is an active RFID tag that requires an on-board power source such as a battery allowing the active tag to transmit and receive signals at greater distance and to carry a larger memory. Another type is a passive RFID tag that has no on-board power source. In this case, the passive RFID tag derives power to transmit data from a signal sent by the RF reader. The effective range of passive tags is smaller than the range of an active RFID tag.

The RFID reader 12 also includes an antenna 12A to communicate with the RFID tag 14. The antenna 12A is configured to send and receive radiofrequency waves at an appropriate communication channel or frequency. For example, in one operation, the RFID reader 12 sends radio waves which creates an induction current in the RFID tag 14 which in turn energizes the electronics (including the chip) of the RFID tag 14. In this case, the RFID 14 is a passive RFID tag. The energized RFID tag 14 sends back a unique code or data that was previously input or written by a user. The communication between the RFID tag 14 and the RFID reader 12 is enabled as long as the RFID tag 14 is in a reading vicinity of the RFID reader 12. There is no requirement that the RFID tag 14 be in direct line of sight of the RFID reader 12.

The system 10 further includes a computer system (e.g., a server computer) 30 in communication with the RFID reader 12. The RFID reader 12 communicates data read from the RFID tag 14 to the computer system 30. This can be accomplished through a wired connection or through a wireless connection.

The computer system 30 is configured to compute an amount of remaining material 22 in the spool 18 based on a thickness of the material 22 and based on a number of revolutions of the spool 18. The number of revolutions being determined by a number of times the RFID tag on the spool comes in a reading vicinity of the RFID reader.

Figure 3:
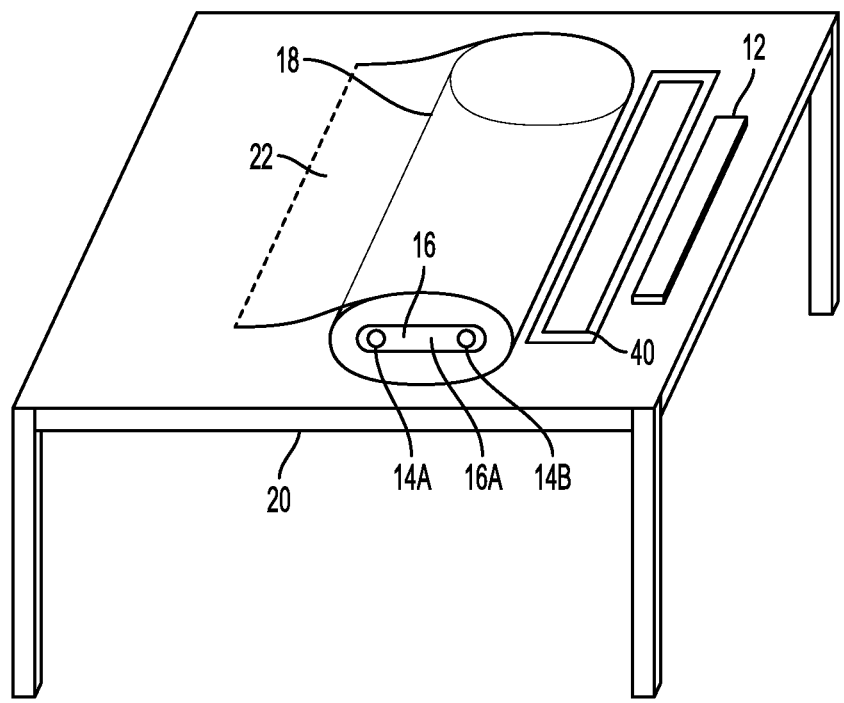
FIG. 3 depicts another set-up for measuring an amount of remaining material, according to another embodiment of the present disclosure.

FIG. 3 depicts another set-up for measuring an amount of remaining material 22, according to another embodiment of the present disclosure. In this embodiment, system 10 includes at least two RFID tags 14A and 14B. The RFID tags 14A and 14B are disposed spaced apart at the end 16A of the core 16 of the spool 18. Each RFID tag 14A, 14B is encoded with a distinct code to distinguish between the at least two RFID tags 14A and 14B. For example, RFID tag 14A may be encoded with code (1) and RFID tag 14B which is spaced apart from RFID 14B may be encoded with code (0). In this way, when the at least two RFID tags 14A, 14B are read sequentially by the RFID reader 12, when in the reading vicinity of the RFID reader 12, the RFID reader 12 counts that the spool 18 performed a full revolution. In other words, when the RFID reader 12 reads the code (1) then reads the code (0) and then code (1) is read again, sequentially, the RFID reader 12 counts that the spool 18 performed a full rotation. In a similar fashion it can be determined when the spool is rotated half of a revolution. In addition, the RFID reader 12 can determine the orientation of the spool and which end of spool 18 is in the vicinity of the RFID reader 12 by reading code (0) or code (1). In an embodiment, the RFID reader 12 is disposed on the support surface 20, as shown in FIG. 3. However, the RFID reader 12 can also be disposed adjacent to the support surface 20 or under the support surface 20. As shown in FIG. 3, the RFID reader 12 is disposed at an end of the support surface 20. However, the RFID reader 12 can be disposed anywhere appropriate to allow reading of the RFID tags 14A and 14B when the store clerk or associate rotates the spool 18. Although two RFID tags 14A and 14B are shown in FIG. 3 for illustration, as it can be appreciated more than two RFID tags 14A and 14B can be used. For example, two other RFID tags (not shown) can be disposed on the opposite side of end 16A. This arrangement can, for example, increase the sensitivity of a detection of a rotation of the spool 18.

One or more of RFID tags 14A and 14B may have a unique identification number or code, respectively, for example, code CA and code CB. For example, the identification number or code CA and/or CB is/are associated with data identifying characteristics of the material 22. In an embodiment, the data identifying characteristics of the material 22 includes at least the thickness of the material 22. The data identifying characteristics of the material 22 may further include the type of material, the thickness of the material, the date of delivery to a store of spool 18 containing the material 22, or a manufacturer's name of the material 22, or any combination thereof.

Returning to FIG. 1, in an embodiment of the present disclosure, the system 10 may further include a material characteristics database 32 in communication with the computer system 30. The material characteristics database is configured to store the data identifying the material 22, such as the thickness of the material, the type of material, the density of the material, etc. In another embodiment, the code can be used to retrieve the characteristics of the material from a database. The characteristics of the material may be stored in the database and not in the RFID tag 14.

In an embodiment, the system 10 may also include a spool inventory database 34 in communication with the computer system 30. The spool inventory database 34 is configured to store a quantity of spools 18 of the material 22 that are available at location(s) selling the material 22. In an embodiment, the quantity of spools 18 stored in the spool inventory database 34 is updated by the computer system 30 each time a spool 18 is consumed or sold.

In an embodiment, the system 10 may further include a material inventory database 36 in communication with the computer system 30. The material inventory database 36 is configured to store an amount of remaining material 22 in the spool 18. This can be performed for each spool 18 in a plurality of spools and for each material 22 (type of material, design of material, thickness or material, etc.).

In an embodiment, the material inventory database 36 is configured to be updated provisionally by the computer system 30 with the amount of remaining material 22 each time at least a portion of the material 22 is removed from the spool 18 at a point of sale and the at least the portion of the material is tagged with a barcode having encoded therein a price of the at least the portion of material 22. The point of sale corresponds to a location where the store clerk or associate measures and cuts a piece or portion of the material 22 as requested by a customer and tags the piece or portion of material 22 with a barcode having a price of the piece or portion of the material 22. The point of sale may or may not be a location where a store clerk or associate takes a payment from the customer for the purchase of the piece of material 22.

In an embodiment, the material inventory database 36 is updated permanently by the computer system 30 with the amount of remaining material 22 when the barcode containing the price of the at least portion or piece of material 22 is scanned and the at least the portion of material 22 is paid for at a cash register. As it can be appreciated, the cash register may be located remote from the point of sale, as is currently setup in large stores, such as WALMART stores. Therefore, the cash register may be distinct from the point of sale. However, the point of sale can also have a cash register in which case upon receipt of a payment for the at least portion or piece of material 22, the material inventory database 36 is simply updated permanently by the computer system without previously updating provisionally the material inventory database 36. This may be the case, for example, in smaller stores or for online stores.

FIG. 1 shows three distinct databases corresponding to the material characteristics database 32, the spool inventory database 34 and the material inventory database 36. However, as it must be appreciated that the database need not be distinct or physically separated from each other. Indeed, the databases may be housed in a same storage device. In addition, it is contemplated that one, two or more databases can be configured to accomplish the functions of the three databases 32, 34 and 36.

In an embodiment of the present disclosure, the system 10 may further include a weighting scale 40 disposed at the support surface 20, as shown in FIG. 3. The weighting scale 40 is configured to measure a weight of the spool 18. In this embodiment, the computer system 30 which is in communication with the RFID reader 12 is configured to further compute the amount of remaining material 22 in the spool 18 based on a measured weight of the spool and using a density of the material 22. In this embodiment, the computer system 30 is further configured to compare the amount of remaining material in the spool obtained using the weight with the amount of remaining material in the spool obtained using the number of revolutions.

In an embodiment, upon determining, by the computer system 30, that the amount of remaining material 22 in the spool 18 obtained using the weight and the amount of remaining material in the spool obtained using the number of revolutions are approximately equal, the computer system 30 computes an average of the amount of remaining material 22 in the spool 18 obtained using the weight and the amount of remaining material 22 in the spool 18 obtained using the number of revolutions, and stores the average in the material inventory database 36. In an embodiment, the average is computed by summing the amount of remaining material 22 in the spool 18 obtained using the weight and the amount of remaining material 22 in the spool 18 obtained using the number of revolutions and dividing by two. The term "approximately equal" in this context means that a difference between the amount of remaining material 22 in the spool 18 obtained using the weight and the amount of remaining material 22 in the spool 18 obtained using the number of revolutions is less than 2% of the amount of remaining material 22 in the spool 18 obtained using the weight.

Figure 4:
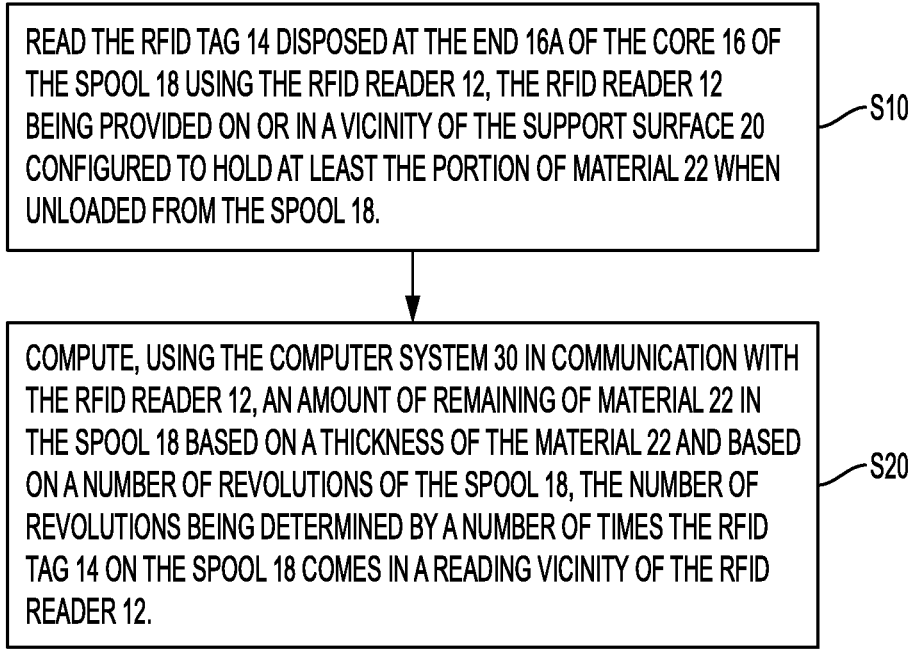
FIG. 4 is a flow chart of a method for determining an amount of material remaining in a spool, according to an embodiment of the present disclosure.

FIG. 4 is a flow chart of a method for determining an amount of material remaining in a spool, according to an embodiment of the present disclosure. The method includes reading the RFID tag 14 disposed at the end 16A of the core 16 of the spool 18 using the RFID reader 12, the RFID reader 12 being provided on or in a vicinity of the support surface 20 configured to hold at least a portion of the material 22 when unloaded from the spool 18, at S10. The method further includes computing, using the computer system 30 in communication with the RFID reader 12, an amount of remaining material 22 in the spool 18 based on a thickness of the material 22 and based on a number of revolutions of the spool 18, the number of revolutions being determined by a number of times the RFID tag 14 on the spool 18 comes in a reading vicinity of the RFID reader 12, at S20. In an embodiment, for example for a cylindrical spool, the amount or length of the material 22 can depend on a diameter or radius of the core 16, the thickness of the material 22 in the spool 18, and a total number of rotations of the material 22 in the spool 18. Therefore, the amount of material removed from the spool also depends on the thickness of the material 22, an initial number of rotation of the material 22 in the spool and the diameter of the core 16. In an embodiment, for example, the greater the initial number of rotations of the material in the spool, the greater the amount of material that can be removed or extracted from the spool with one rotation of the spool. Also, the lesser the initial number of rotations of the material in the spool, the lesser the amount of material that can be extracted or removed from the spool with one rotation of the spool. This variance may be accounted for by an algorithm that is implemented on the computer system 30. The algorithm takes into account the diameter of the core 16, the initial number of rotations of the material 22 in the spool 18 and the thickness of the material 22 in the spool 18. For example, the initial number of rotations of material in the spool 18 can be extracted from a last recorded number of remaining rotations in the spool 18 stored or recorded in a database.

In an embodiment, the method further includes provisionally storing, in a material inventory database 36 in communication with the computer system 30, the amount of remaining material 22 in the spool 18.

In an embodiment, the method may also include generating, by the computer system 30, a barcode having encoded therein a price of at least a portion of material 22 removed from the spool 18 at a point of sale for tagging the at least the portion of material 22, and updating, by the computer system 30, permanently the amount of remaining material 22 when the barcode is scanned and the at least the portion of material 22 is paid for at a cash register. In an embodiment, the barcode can be generated based on a code read from the RFID tag 14. The barcode can determine the amount of material removed and price of material removed. The barcode can be printed. As a result, a store associate need not enter the amount and/or price of the material removed into the computer system 30.

In an embodiment, the method includes storing, in a spool inventory database 34 in communication with the computer system 30, a quantity of spools of the material 22 that are available at each outlet store selling the material 22. In an embodiment, the method may also include updating the quantity of the spools, by the computer system 30, stored in the spool inventory database 34 each time a spool is consumed or sold.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Although the embodiments of disclosure have been described in detail for the purpose of illustration based on what is currently considered to be the most practical, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed:

1. A system for determining an amount of material remaining in a spool, the system comprising:
   a support surface configured to hold at least a portion of the material when unloaded from the spool;
   a radiofrequency identification (RFID) reader, the RFID reader being configured to read an RFID tag disposed at an end of a core of the spool, the RFID reader being provided on or in a vicinity of the support surface, the RFID tag having a unique identification number associated with data identifying characteristics of the material;
   a computer system in communication with the RFID reader, the computer system being configured to determine a number of revolutions of the spool, the number of revolutions being determined by a number of times the RFID tag on the spool comes in a reading vicinity of the RFID reader;
   a spool inventory database in communication with the computer system, the spool inventory database is configured to store a number of revolutions for the spool and a quantity of spools of the material that are available at each location selling said material, the computer system being configured to further compute a variance based on a thickness of the material and a number of previous revolutions of the spool and to determine an amount of remaining material in the spool based on a current number of revolutions of the spool and the variance; and
   a material inventory database, separate from the spool inventory database, in communication with the computer system, the material inventory database is configured to store the amount of remaining material in the spool, wherein the RFID reader is further configured to read another RFID tag disposed at the end of the core of the spool and spaced apart from the first mentioned RFID tag, said first mentioned RFID tag having a first identification and said other RFID tag having a second identification different from said first identification so as to distinguish between said first mentioned RFID tag and said other RFID tag such that when said first mentioned RFID tag and said other RFID tag are read in sequence by the RFID reader, the RFID reader counts that the spool performed at least a full revolution.

2. The system of claim 1 further comprising a weighting scale disposed at the support surface, the weighting scale being configured to measure a weight of the spool, wherein the weight of the spool is used to determine the amount of remaining material in the spool.

3. The system according to claim 2, wherein upon determining, by the computer system, that the amount of remaining material in the spool obtained using the weight and the amount of remaining material in the spool obtained using the number of revolutions are approximately equal, the computer system computes an average of the amount of remaining material in the spool obtained using the weight and the amount of remaining material in the spool obtained using the number of revolutions, and stores the average in the material inventory database.

4. The system according to claim 2, wherein the characteristics of the material include the thickness of the material and the density of the material.

5. The system according to claim 4, further comprising a material characteristics database, the material characteristics database being configured to store the data identifying the characteristics of the material including the thickness of the material and the density of the material.

6. The system according to claim 1, wherein the data identifying the characteristics of the material comprises a type of material, the thickness of the material, a date of delivery to a store of the material, or a manufacturer's name of the material, or any combination thereof.

7. A system for determining an amount of material remaining in a spool, the system comprising:
   a radiofrequency identification (RFID) reader, the RFID reader being configured to read an RFID tag disposed at an end of a core of the spool, the RFID reader being provided on or in a vicinity of a support surface configured to hold at least a portion of the material when unloaded from the spool, the RFID tag having a unique identification number associated with data identifying characteristics of the material; and a computer system in communication with the RFID reader, the computer system being configured to compute an amount of remaining material in the spool based on a thickness of the material and based on a number of revolutions of the spool, the number of revolutions being determined by a number of times the RFID tag on the spool comes in a reading vicinity of the RFID reader, wherein the RFID reader is further configured to read another RFID tag disposed at the end of the core of the spool and spaced apart from the first mentioned RFID tag, said first mentioned RFID tag having a first identification and said other RFID tag having a second identification different from said first identification so as to distinguish between said first mentioned RFID tag and said other RFID tag such that when said first mentioned RFID tag and said other RFID tag are read in sequence by the RFID reader, the RFID reader counts that the spool performed at least a full revolution.

8. The system according to claim 7, wherein at least two RFID tags are disposed spaced apart at the ends of the core of the spool and each RFID tag is encoded with a distinct code to distinguish between the at least two RFID tags such that when the at least two RFID tags are read sequentially by the RFID reader, when in the reading vicinity of the RFID reader, the RFID reader counts that the spool performed a full revolution.

9. The system according to claim 7, wherein the characteristics of the material include the thickness of the material.

10. The system according to claim 7, further comprising a material characteristics database, the material characteristics database configured to store the data identifying the characteristics of the material.

11. The system according to claim 7, further comprising a spool inventory database in communication with the computer system, the spool inventory database is configured to store a quantity of spools of the material that are available at each outlet store selling said material.

12. The system according to claim 7, further comprising a material inventory database in communication with the computer system, the material inventory database is configured to store the amount of remaining material in the spool.

13. The system according to claim 12, wherein the material inventory database is updated provisionally by the computer system with the amount of remaining material each time at least a portion of the material is removed from the spool at a point of sale and the at least the portion of the material is tagged with a barcode having encoded therein a price of said at least portion of material.

14. The system according to claim 13, wherein the material inventory database is updated permanently by the computer system with the amount of remaining material when the barcode is scanned and the at least the portion of material is paid for at a cash register.

15. A method for determining an amount of material remaining in a spool, the method comprising:
reading using a radiofrequency identification (RFID) reader an RFID tag disposed at an end of a core of the spool, the RFID reader being provided on or in a vicinity of a support surface configured to hold at least a portion of the material when unloaded from the spool, the RFID tag having a unique identification number associated with data identifying characteristics of the material; and
computing, using a computer system in communication with the RFID reader, an amount of remaining material in the spool based on a thickness of the material and based on a number of revolutions of the spool, the number of revolutions being determined by a number of times the RFID tag on the spool comes in a reading vicinity of the RFID reader;
reading another RFID tag disposed at the end of the core of the spool and spaced apart from the first mentioned RFID tag, said first mentioned RFID tag having a first identification and said other RFID tag having a second identification different from said first identification so as to distinguish between said first mentioned RFID tag and said other RFID tag such that when said first mentioned RFID tag and said other RFID tag are read in sequence by the RFID reader, the RFID reader counts that the spool performed at least a full revolution.

16. The method according to claim 15, further comprising provisionally storing, in a material inventory database in communication with the computer system, the amount of remaining material in the spool.

17. The method according to claim 16, further comprising:
generating, by the computer system, a barcode having encoded therein a price of at least a portion of material removed from the spool at a point of sale for tagging said at least the portion of material,
updating, by the computer system, permanently the amount of remaining material when the barcode is scanned and the at least the portion of material is paid for at a cash register.

18. The method according to claim 15, further comprising storing, in a spool inventory database in communication with the computer system, a quantity of spools of the material that are available at each outlet store selling said material.

19. The method according to claim 18, further comprising updating the quantity of the spools, by the computer system, stored in the spool inventory database each time a spool is consumed or sold.

* * * * *